United States Patent [19]

Pope et al.

[11] Patent Number: 5,371,051
[45] Date of Patent: Dec. 6, 1994

[54] METHOD FOR PRODUCING HIGH OPACIFYING KAOLIN PIGMENT

[75] Inventors: William H. Pope, Sandersville; Michael W. Ginn, Wrightsville; R. Brock McNeely, Davisboro, all of Ga.

[73] Assignee: ECC International Inc., Atlanta, Ga.

[21] Appl. No.: 172,552

[22] Filed: Dec. 23, 1993

[51] Int. Cl.⁵ ............................... C04B 33/02
[52] U.S. Cl. .................... 501/145; 501/149; 501/150; 106/416; 106/488
[58] Field of Search ............ 501/145, 149, 150; 106/416, 468, 486, 488

[56] References Cited

U.S. PATENT DOCUMENTS

| | | | |
|---|---|---|---|
| 2,307,239 | 1/1943 | Rowland | 162/181.8 |
| 3,383,438 | 12/1965 | Allegrini et al. | 106/437 |
| 3,450,257 | 6/1969 | Cundy | 162/81.2 |
| 3,586,523 | 6/1971 | Fanselow | 106/486 |
| 3,627,678 | 12/1971 | Marston et al. | 210/42 |
| 4,026,762 | 5/1977 | Bauman | 106/416 |
| 4,028,173 | 6/1977 | Olson | 162/181 A |
| 4,098,688 | 7/1978 | Nott | 209/166 |
| 4,381,948 | 5/1983 | McConnell et al. | 209/5 |
| 4,518,491 | 5/1985 | Bilimoria et al. | 209/166 |
| 4,650,521 | 3/1987 | Koppelman et al. | 524/447 |
| 4,916,094 | 4/1990 | Salinas | 501/146 |
| 5,006,574 | 4/1991 | Sennett et al. | 523/351 |
| 5,011,534 | 4/1991 | Berbube et al. | 106/416 |
| 5,047,375 | 9/1991 | Dunaway et al. | 106/439 |
| 5,112,782 | 5/1992 | Brown et al. | 501/144 |
| 5,137,574 | 8/1992 | Suitch et al. | 106/439 |
| 5,152,835 | 10/1992 | Nemeh | 106/437 |
| 5,232,881 | 8/1993 | Wu | 501/148 |

FOREIGN PATENT DOCUMENTS 0382427 8/1990 European Pat. Off. .
0396419 11/1990 European Pat. Off. .

*Primary Examiner*—Karl Group
*Assistant Examiner*—Chris Gallo
*Attorney, Agent, or Firm*—Klauber & Jackson

[57] ABSTRACT

A method for producing calcined kaolin pigments of high opacifying properties and low abrasion. A kaolin crude is selected having a G.E. brightness in the range of 70 to 80, a titania content of 2.0 to 3.0% by weight, less than 2% iron expressed as $Fe_2O_3$, and a particle size distribution such that at least 88% by weight of the particles of said crude are of less than 2 $\mu$m E.S.D.. The crude is blunged with water, and the resultant slurry degritted to form an aqueous slurry having at least 65% by weight solids. The slurry is centrifuged and a fraction recovered having over 65% solids, and in which at least 92% by weight of the particles are of less than 2 $\mu$m. The recovered fraction is dried to less than 1% moisture, and pulverized to break up agglomerates. The pulverized fraction is then calcined by heating same to 1450° to 1600° F. after which the calcined kaolin is milled to yield a product having a G.E. brightness of 79 to 81 and an Einleiner abrasion of not more than 2.5 mg wt loss.

5 Claims, No Drawings

METHOD FOR PRODUCING HIGH OPACIFYING KAOLIN PIGMENT

BACKGROUND OF THE INVENTION

This invention relates generally to calcined clay products, and more specifically relates to a calcined kaolin clay pigment and method of manufacture of same. The pigment produced by the method of the invention has a low abrasion and very high opacifying properties when incorporated as a filler in paper products.

In the course of manufacturing paper and similar products, it is well known to incorporate quantizes of inorganic materials into the fibrous web in order to improve the quality of the resulting product. The use of appropriate such fillers vastly improves the opacity and printability of certain types of light weight papers such as newsprint. This aspect of use of calcined kaolin clay pigments is discussed in some detail, for example, Fanselow and Jacobs, U.S. Pat. No. 3,586,523. Other aspects of the presently preferred commercial methods manufacturing calcined kaolin pigments for use particularly as fillers in paper manufacture, are also set forth in the said *Fanselow et al* patent, as well as in additional United States patents such as *McConnell et al*, U.S. Pat. No. 4,381,948.

The Fanselow et al and McConnell et al patents are indeed representative of the methodology widely employed in the kaolin industry in order to produce calcined kaolin clay pigments for use in paper manufacturing. Study of these patents will show that the objective of same, as is customary in the art, is to produce a fine particle size calcined kaolin clay pigment of relatively very high brightness, beginning with a crude kaolin which has a relatively very low brightness. A preferred crude feed material for use in processes such as are disclosed in the Fanselow and McConnell patents, is a highly discolored, so-called "gray" kaolin, which is referred to in the Fanselow patent as a "hard sedimentary kaolin clay." Thus, the gray crude which is used in the example of Fanselow has an initial brightness of 78, where the figure cited refers to the so-called G.E. scale. Procedures for measuring brightness as set forth in this application, and as is generally recognized in the industry, are in accord with TAPPI procedure T646os75. As a result of the beneficiation treatment set forth in the Fanselow et al patent, these brightnesses are considerably increased indeed to a very high whiteness. Claim 2 of the Fanselow et al patent thus recites a G.E. brightness within the range of 92% to 95%. Similarly, the McConnell et al patent describes a resultant pigment having a brightness of at least 93 as being the final output product from practice of the beneficiation methods set forth therein. A calcined kaolin pigment substantially produced in accordance with the McConnell et al patent is available commercially from ECC International Inc. of Atlanta, Ga., under the trademark ALPHATEX ®.

It may be noted that both the McConnell et al. and the Fanselow et al. patents are concerned with fully calcined kaolins as opposed to metakaolins. When an uncalcined kaolin is heated (i.e. calcined) to about 1098° F. an endothermic reaction occurs. Essentially all of the water of hydration associated with the uncalcined kaolin crystals is eliminated and an essentially amorphous (as measured by X-ray diffraction) material referred to as "metakaolin" results. If the kaolin is heated to higher temperatures, further significant changes occur. The metakaolin undergoes an exothermic reaction (which typically occurs at about 1700° to 1800° F.). Such material is then referred to as a "fully calcined kaolin".

In the McConnell patent, it is emphasized that the crude used to produce the high brightness pigments preferably includes not more than 2% by weight of titanium expressed as $TiO_2$. A principal reason for this is that clay minerals occurring in nature, including kaolin clays, frequently contain their discoloring contaminants in the form of iron and/or titanium-based impurities. The quantities of the titaniferous impurities in sedimentary kaolins of Georgia are significant and are commonly present as iron oxide-stained titanium oxides. Irrespective of whether calcining is used, it has commonly been considered in the kaolin industry that it is paramount to refine the crude kaolins to bring the brightness characteristics of the resultant product to a level acceptable for various applications such as paper coating, or as mentioned, even for filling. Among the techniques which have been used in the past to remove the discoloring impurities, are the use of hydrosulfites for converting at least part of the iron-based impurities to soluble form, which may then be extracted from the clay. A further method which has come into increasing use in the kaolin industry involves the use of high intensity magnetic separation as described, for example, in such patents as Marston, U.S. Pat. No. 3,627,678. This method is also useful in removing titaniferous impurities in that although titania when pure has little magnetic attractability, the iron-stained titania which forms the basis (as mentioned) for the bulk of discolorants in many kaolins, may often be quite effectively removed by imposition of such a high intensity magnetic field.

One of the further, very effective methods for removing titaniferous impurities including iron oxide-stained titanium oxides, is the froth flotation technique. Generally according to this method, an aqueous suspension or slurry of the clay is formed, the pH of the slurry is raised to an alkaline value and a collector agent is added. The slurry is then conditioned by agitating for a short period. A frothing agent if necessary is added to the conditioned slurry, after which air is passed through the slurry in a froth flotation cell to effect separation of the impurities from the mineral.

Further details regarding the use of froth flotation techniques for removing titanium-based impurities from kaolins may be found at numerous places in the prior art, including for example U.S. Pat. No. 3,450,257 to E. K. Cundy, U.S. Pat. No. 4,518,491 to B. M. Bilimoria, and U.S. Pat. No. 4,090,688 to Alan Nott. In the procedures set forth in these patents, the iron-stained titania "contaminants" are separated with the froth. These separated materials, because of their very high titania content and high degree of discoloration, have in the past simply been termed "rejects," and as such discarded or used for some purpose unrelated to being pigments for paper manufacture. What therefore is to be especially appreciated, is that the discoloring iron-stained titania-based impurities removed from the crude kaolin by froth flotation (or even where such materials have been removed by magnetic separation), have heretofore been regarded as essentially useless material having little or no economic value for proper manufacture. The view in short, has in the past been that the object of beneficiation of kaolins was simply stated to remove these "contaminants" to thereby brighten the output product from which these contaminants had been removed.

Both the brightness characteristics of the given kaolin and the opacifying properties of same when incorporated as a filler in paper, may be quantitatively related to a property of the filler identified as the "scattering coefficient S". The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g. to U.S. Pat. No. 4,026,726 and U.S. Pat. No. 4,028,173. In addition to the citations set forth in these patents, reference may further be had to Pulp and Paper Science Technology, Vol. 2 "Paper", Chapter 3, by H. C. Schwalbe (McGraw-Hill Book Company, New York).

One of the long-recognized concerns that arises where a kaolin clay is subjected to calcination is the increase in abrasiveness, which can result from the formation of various abrasive phases during the calcination process. The presence of iron in the form e.g. of iron-stained titania, can promote the formation of these undesired phases, and thereby contribute to the unwanted abrasiveness in the calcined product. It is therefore a concern that any process which promotes the presence of high titania content in the calciner feed, could lead to a calcined product having undesirably high abrasion characteristics. Such abrasiveness is detrimental to the principal use of the pigments, since among other things, it effects rapid wear at portions of the paper making apparatus. The generation of abrasive phases is a particularly acute problem where the higher temperatures incident to full calcination are employed.

In accordance with the teachings of U.S. Pat. No. 5,047,375, and contrary to prior experience and practice in the kaolin industry, it was found that a pigment possessing highly useful properties, especially with respect to opacifying light weight paper such as newsprint, may be produced by calcining the very high titania content "rejects" yielded by practice of conventional froth flotation beneficiation. Other "rejects" having similar high content of iron-stained titania, as for example those yielded from high intensity magnetic separation (H.I.M.S.), may also be used in the invention disclosed in the U.S. Pat. No. 5,047,375.

According to such patent, an iron-stained titania-containing kaolin is subjected to froth flotation, after which froth "rejects" comprising kaolin enriched in said iron-stained titania are recovered, then subjected to dewatering and drying, to thereby produce a kaolin enriched in titania. This intermediate is calcined at a temperature in the range of about 1500° to 2200° F. to yield the finished product. The froth "rejects" are not otherwise beneficiated prior to calcining, but are used in their as-is form as recovered from the flotation process. The starting material subjected to the froth flotation is typically a naturally occurring kaolin crude having a titania content of from about 1 to 2 weight %, and the enriched kaolin yielded from the froth flotation process has a titania content of from about 2 to about 15 weight % and preferably has a titania content of at least 5 weight %. Similar considerations apply where H.I.M.S. is the source of the rejects. When the pigment produced in accordance with the U.S. Pat. No. 5,047,375 is utilized in the filling of paper, it imparts a brightness in the range of about 60 to 90, but yields substantially higher opacifying properties than a prior art calcined kaolin not enriched in titania. Yet more preferably, the brightness of the pigment resulting is in the range of about 60 to 80. Pigments having these brightness values had previously been considered undesirable for use as fillers; but in accordance with the U.S. Pat. No. 5,047,375 invention, these fillers were found to produce very high opacifying properties, thereby vastly improving the use and printability of such thin, "low grade" papers such as newsprint.

A related teaching is found in U.S. Pat. No. 5,137,574, where the high opacifying pigment is produced by calcining one or more high titania content kaolin fractions which are separated from a whole crude by size classification, froth flotation, magnetic separation or the like.

In one method of practicing the U.S. Pat. No. 5,137,574 invention, there is separated from one or more iron-stained titania-containing crude kaolins having a titania content of from about 1 to 2 weight percent, one or more titania-enriched kaolin fractions, containing titania in the amount of above 2 weight percent. The one or more enriched kaolin fractions are subjected to wet particulate media grinding. The ground fraction or fractions are dewatered and dried, and then calcined at a temperature in the range of about 1500° to about 2200° F. The products yielded from calcination can then be pulverized to a desired screen size to yield the finished product.

The one or more separated kaolin fractions may include the reject portion from a froth flotation treatment of the iron-stained crude kaolin. Each of the fraction or fractions subjected to media grinding contains over 2% titania. If only a single fraction is used, its titania content will be up to about 3%. If multiple fractions are used, some may have as much as 8% titania; but the relative proportions of the several fractions is such that the total material subjected to the media grinding has a titania content of from 2 to 3%. Preferably the one or more fractions are thus sandground to provide a P.S.D. of sufficient fineness so that at least $90\% < 2$ $\mu$m (by weight).

In a preferred procedure, the one or more media ground fractions are blended with a fine particle size unground kaolin prior to calcining. The unground kaolin can e.g. be the recovered product from a centrifuge separation incident to beneficiation of a kaolin crude, and has a titania content of less than 2%. The unground kaolin is already of reduced particle size (e.g. being the fine cut from centrifuging, such as $92\% < 2$ $\mu$m), and as is known, will therefore be relatively free of elements which generate abrasive phases upon calcining. The proportion of the media ground fraction or fractions to the unground kaolin is such as to provide a kaolin calciner feed with above 2% to about 3% titania. The one or more fractions may comprise 30 to 50% of the blend, and the unground kaolin comprises the balance.

The use of the aforementioned media grinding step is deemed necessary in the U.S. Pat. No. 5,137,574 in order to reduce the particle size of the separated fraction or fractions, in that by virtue of the use of a titania-enriched fraction, the abrasion of the final calcined product can become unacceptably high. By reducing the particle size of the ground product to a range such that at least 85% (and preferably 90%) by weight are beneath 2 micrometers, the high titania content does not unduly affect the abrasion, while at the same time the opacifying properties of the pigment are substantially retained. The grinding step is preferably accomplished by use of a media such as fine sand, silica, quartz or the like.

The brightness of the high opacifying fully calcined pigment resulting from the process of the U.S. Pat. No. 5,137,574 patent is in the range of about 70 to 82. The Bruening abrasion is less than 42, and the titania content is greater than 2% by weight. The Bruening abrasion is preferably below 35, and may be in the range of 20–35.

To be noted is that brightness values as indicated have typically been considered undesirable for use as fillers; but in accordance with the U.S. Pat. No. 5,074,375 and U.S. Pat. No. 5,137,574, these fillers have been found to produce very high opacifying properties, thereby vastly improving the use and printability of such thin, "low grade" papers such as newsprint.

A further pertinent teaching is found in Berube et al., U.S. Pat. No. 5,011,534. In the method disclosed therein a low abrasion kaolin clay pigment suitable for filling paper is produced from mechanical pulp by selecting a kaolin crude composed of kaolin particles having a low crystallinity index, a G.E. brightness below 82%; a particle size distribution such that at least 75% by weight is finer than 2 microns; the kaolin containing at least 1.2% by weight $Fe_2O_3$ and at least 2% by weight $TiO_2$. The crude is formed into a dispersed aqueous pulp containing at least about 55% clay solids, centrifuged to remove grit, and without subjecting the resulting degritted slip to bleaching or further particle size fractionation is spray dried to produce pulverulent microspheres. The microspheres are pulverized and calcined until the kaolin undergoes at least partially the characteristic kaolin exotherm (in the Example the Samples are heated to 1900° F.), and then repulverized. The resulting calcined clay has a G.E. brightness from 70 to 84%.

SUMMARY OF INVENTION

Now in accordance with the present invention, it has unexpectedly been found that calcined kaolin pigments of high opacifying properties and low abrasion, may be produced by a process which is vastly simplified and economically advantageous as compared to the prior art processes of the aforementioned U.S. Pat. No. 5,047,375 and U.S. Pat. No. 5,137,574, and which nonetheless produce products which are equal or superior to those produced by the processes of the said patents.

According to the present invention, a kaolin crude is selected having a G.E. brightness in the range of 70 to 80, a titania content of 2.0 to 3.0% by weight, less than 2% iron expressed as $Fe_2O_3$, and a particle size distribution such that at least 88% by weight of the particles of said crude are of less than 2µm E.S.D.. The crude is blunged with water, and the resultant slurry degritted to form an aqueous slurry having at least 65% by weight solids. The slurry is centrifuged and a fraction recovered having over 65% solids, and in which at least 92% by weight of the particles are of less than 2µm. The recovered fraction is dried to less than 1% moisture, and pulverized to break up agglomerates. The pulverized fraction is then calcined by heating same to 1450° to 1600° F., after which the calcined kaolin is milled to yield a product having a G.E. brightness of 79 to 81, and an Einleiner abrasion of not more than 2.5 mg weight loss.

The crude utilized in the process preferably has a G.E. brightness which is less than 80. The calcining can be carried out in a conventional vertical calciner such as a Hereschoff furnace.

When a pigment produced in accordance with the invention is utilized in the filling of paper, it imparts a sheet brightness in the range of about 58 to 60 when used in newsprint, up to about 82 when incorporated in a bleached furnish, and yields excellent opacifying properties.

DESCRIPTION OF PREFERRED EMBODIMENT

The practice of the present invention will now be illustrated by Examples, which are deemed illustrative of the invention and not delimitative thereof.

EXAMPLE

The crude kaolin utilized in this Example as the starting feed for the process of the invention was a blend from two kaolin deposits. As blended, the crude feed had a PSD of 99% <10 µm; 98% <5 µm; 90% <2 µm; 82% <1 µm; 60% 0.5 µm and 12% <0.25 µm. This crude was shredded and blunged with water, ammonium hydroxide and an ammonium polyacrylate dispersant at a pH of about 8.0 and at about 68–70% solids. The slurry was degritted through a 200 mesh screen and was then subjected to a separation in a Bird centrifuge. The recovered fraction had a PSD such that 92 to 93% by weight of the particles were <2 µm E.S.D. The recovery was 84% and the solids content of the slurry was over 65%. The slurry was dried to about 1% moisture and then premilled to break up agglomerates. The resulting calciner feed was then calcined in a laboratory calciner at a feed material temperature of about 1550° F. for 17 minutes. The physical properties of the resulting material are shown in Table I. For comparison corresponding properties of the Alphatex ® and Opacitex ® products of the assignee are given. Alphatex ® is a conventional fully calcined kaolin which is prepared by a process substantially in accord with the aforementioned McConnell et al. U.S. Pat. No. 4,381,948. The Opacitex ® product is prepared as in U.S. Pat. No. 5,137,574.

TABLE I

| | Alphatex ® | Opacitex ® | Product of Invention |
|---|---|---|---|
| Description | Powder | Powder | Powder |
| Brightness | 92.2 | 80.9 | 79.8 |
| <10 Microns | 99 | 100 | 99 |
| <2 Microns | 91 | 88 | 94 |
| <1 Micron | 85 | 74 | 78 |
| <½ Micron | 58 | 42 | 54 |
| <¼ Micron | 11 | 9 | 9 |
| % Titanium Dioxide | 1.04 | 2.22 | 2.558 |
| % Iron Oxide | 0.569 | — | 1.086 |
| Einleiner Abrasion (mg wt loss) | 5.0 | 2.5 | 2.5 |

Einleiner Abrasion is determined by a procedure similar to that described in U.S. Pat. No. 5,011,534. The Sample to be tested is prepared, however, at 10% solids, and screen wear evaluated after 174,000 revolutions. The Einleiner Abrasion is reported in mg weight loss per 100,000 revolutions.

The pigment products of this Example were subjected to tests to determine the pigment scattering coefficient and absorption of the pigment when same was used as a filler in paper at a 10% loading factor by weight. More specifically, the pigment was tested at 10% loading in Storafite (trademark of Nova Scotia Forest Industries) bleached sulphite pulp beaten to a CSF (Canadian Standard Freeness) of 300–350. Deionized water was used in the sheet formation, together with 8 lbs/ton alum, and Percol 292 (trademark of Allied Colloids) as a retention aid.

This 10% value was derived by nominally loading the material at 5, 10, and 15%, obtaining the sheet scatter for the three sets of sheets, fitting the points to a straight line by a least square analysis, and calculating the 10% level by the equation generated.

As a control, the aforementioned Alphatex ® product was used at 10% loading under otherwise identical conditions. Table II sets forth brightness, opacity and scatter levels achieved at 10% filler level for the samples. All scattering data are normalized by comparison to the scattering coefficient of samples of the aforementioned Alphatex ®. Ideally in a study of the present nature, the same batch of beaten pulp should be used throughout. As this is not practical, the method adopted was to fill one set of sheets in each series of tests using the same Alphatex ® from series to series. Statistically, the Alphatex ® filled samples at 10% filler had a scattering coefficient of 680 cm²/gram, and in each series in which Alphatex ® differed from 680, the scattering coefficients of the experimental samples were accordingly adjusted proportionally to the adjustments which the Alphatex ®-containing paper required to bring its value to 680 cm²/gram. This procedure, which was used in subsequent examples, is from time to time referred to in the specification as "normalizing" the scattering coefficients.

Opacity was determined by TAPPI procedure T519 om-91. Pigment scatter was determined by the procedures referenced in the discussion of the Kubelka and Munk paper op, cit.

TABLE II

| | Evaluation of Products in Sulphite Pulp 60 GSM 10% Filler | | | | |
|---|---|---|---|---|---|
| Filler | Brightness | Opacity % | Sheet Scatter cm²/g | Normalized Scatter cm²/g | Pigment Scatter cm²/g |
| Unfilled | 81.2 | 67.2 | 258 | — | — |
| Alphatex | 87.4 | 83.5 | 641 | 680 | 4480 |
| Opacitex | 81.6 | 85.3 | 617 | 655 | 4230 |
| Product of Invention | 80.8 | 84.3 | 591 | 627 | 3950 |

48 gsm handsheets were made using repulped newsprint. Fillers were added at levels targeting 2, 4 and 6%. These sheets were calendered prior to testing. Sheet properties vs. filler level interpolated from the resulting data for 4% loading are given in Table III.

The product of the invention is seen to provide equivalent or superior optical and print properties as compared to Opacitex ®.

TABLE III

| | Evaluation of Products in Newsprint 48 GSM 4% Filler | | | | | |
|---|---|---|---|---|---|---|
| | Brightness | Scatter | Opacity | Print Thru | Show Thru | Strike Thru |
| Alphatex | 59.5 | 594 | 94.9 | .088 | .035 | .041 |
| Opacitex | 58.7 | 580 | 94.6 | .091 | .028 | .062 |
| Product of Invention | 58.6 | 582 | 94.9 | .094 | .028 | .066 |

Using an IGT AIC2 Printability Tester, the following procedures were used to calculate the translucency (show-through) of newsprint, the apparent increase in translucency due to ink penetration (strike-through), and the combined effect of translucency and ink penetration (print-through) by measuring marked positions on a paper sample before and after printing. Samples to be tested are cut to a test size, a minimum of six are considered necessary to obtain a reliable result. Densitometer readings are taken at eight to ten positions on the wire side of each sample using the black filter setting. Each sample is backed by the other five of the same set. (Termed self-backed—Doo). Densitometer readings are taken at eight to ten positions on the wire side of each sample with the sample backed by a solid black surface. (Termed black-backed—DB) For printing (in a controlled atmosphere), the AIC2 is set at 3.5 m/s constant speed in conjunction with 20 kgf printing pressure, bottom sector, with a paper backing (six thicknesses of manila folder) on the printing sector. 1.0 ml of ink are allowed to distribute on the inking unit for 5 minutes. Then two aluminum printing discs are inked for sixty seconds. The samples are printed on the felt side. The samples are alternated to obtain similar conditions over the range of ink film density covered between the first and last prints. After printing eight to ten densitometer readings are taken on the wire side which are now backed by a solid black print. (Termed back-of-print—DP) Eight to ten densitometer readings are taken on the solid black print. The print through figures are calculated as follows:

a. Average the sets of eight to ten readings per strip
b. SHOW-THROUGH
   Black-backed (DB minus self-backed Doo)
   $$DB - Doo = \log_{10} \frac{Roo}{RB}$$
c. STRIKE-THROUGH
   Back-of-print (Dp) minus Black-backed (DB)
   $$Dp - DB = \log_{10} \frac{RB}{Rp}$$
d. PRINT-THROUGH
   Back-of-print (Dp) minus Self-backed (Doo)
   $$Dp - Doo = \log_{10} \frac{Roo}{Rp}$$
   or Show-through + Strike-through While the present invention has been set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. A method for producing a high opacifying calcined kaolin pigment, comprising:
   selecting a kaolin crude having a G.E. brightness in the range of 70 to 80, a titania content of 2.0 to 3.0% by weight, less than 2% iron expressed as $Fe_2O_3$, and a particle size distribution such that at least 88% by weight of the particles of said crude are of less than 2 μm E.S.D.;

blunging said crude with water and degritting the resultant slurry to form an aqueous slurry having at least 65% by weight solids;

subjecting said slurry to a separation in a centrifuge and recovering a fraction having over 65% solids, and in which at least 92% by weight of the particles are of less than 2 μm;

drying said recovered fraction to less than 1% moisture;

pulverizing said dried fraction to break up agglomerates and form a calciner feed material;

calcining said feed material by heating same to 1450° to 1600° F. for a sufficient time to form said calcined kaolin; and milling the calcined kaolin to yield a product having a G.E. brightness of 79 to 81, and an Einleiner abrasion of not more than 2.5 mg wt loss.

2. A method in accordance with claim 1, in which said crude has a G.E. brightness which is less than 80.

3. A method in accordance with claim 1, in which said calcining is effected by heating said feed material in a vertical calciner.

4. A method for producing a high opacifying low abrasion calcined kaolin pigment, comprising:

selecting a kaolin crude having a G.E. brightness in the range of 70 to 80, a titania content of 2.0 to 3.0% by weight, less than 2% iron expressed as $Fe_2O_3$, and a particle size distribution such that at least 88% by weight of the particles of said crude are of less than 2 μm E.S.D.;

forming said crude into an aqueous slurry having at least 65% solids, and subjecting said slurry to a particle size separation to recover a fraction having over 65% solids, and in which at least 92% by weight of the particles are of less than 2 μm;

drying and pulverizing said recovered fraction to yield a calciner feed material;

calcining said feed material at a material temperatures of from 1450° to 1600° F. to form a calcined kaolin; and milling the calcined metakaolin to yield a product having a G.E. brightness of 79 to 81, and an Einleiner abrasion of not more than 2.5 mg wt loss.

5. A method in accordance with claim 4, in which said crude has a G.E. brightness which is less than 80.

* * * * *